UNITED STATES PATENT OFFICE.

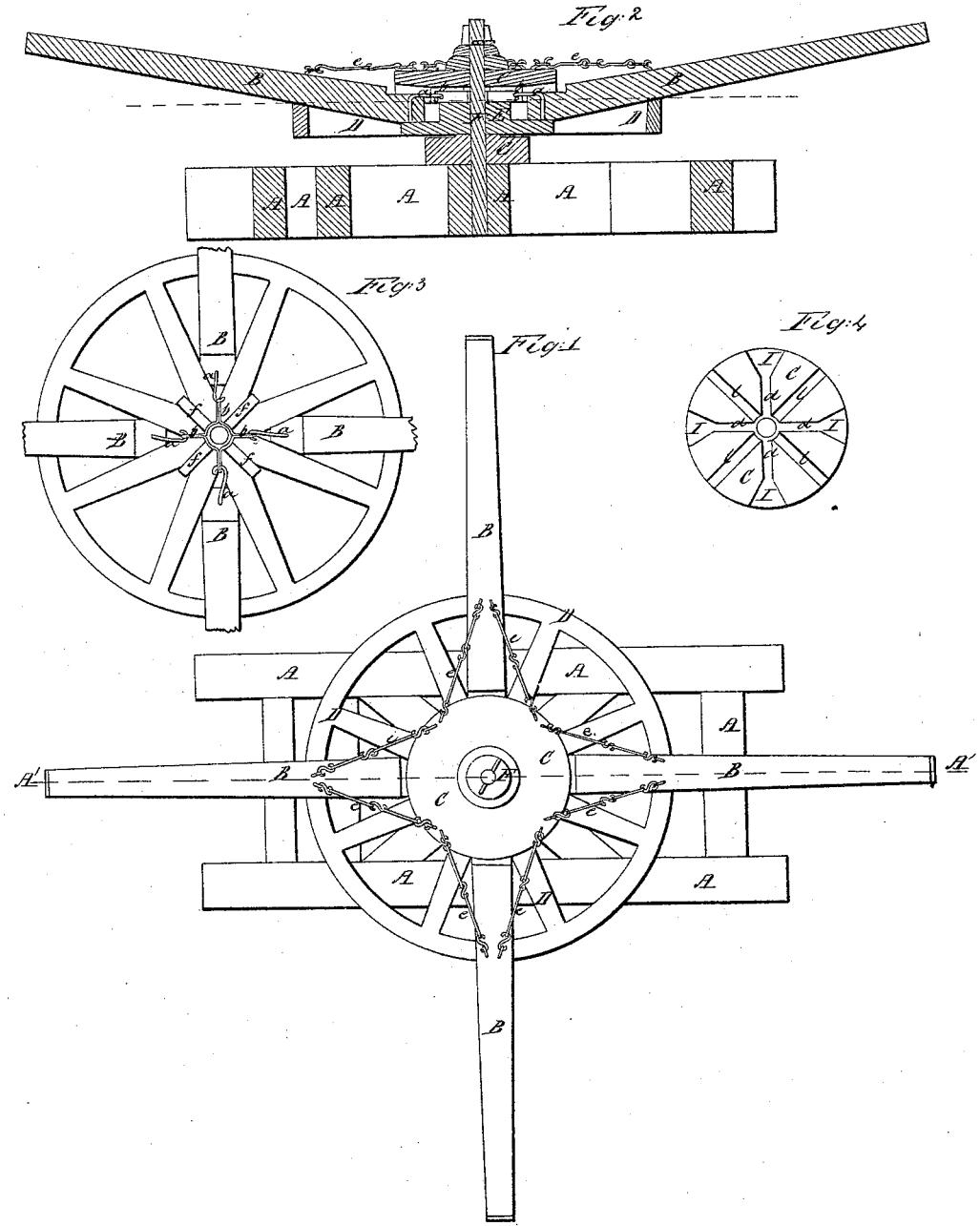

WORDEN P. PENN, OF BELLEVILLE, ILLINOIS.

HORSE-POWER.

Specification of Letters Patent No. 27,235, dated February 21, 1860.

*To all whom it may concern:*

Be it known that I, WORDEN P. PENN, of Belleville, in St. Clair county and State of Illinois, have invented a new and useful Improvement in Horse-Powers; and I do hereby declare that the following is a full, clear, and exact description of the same, reference being had to the annexed drawing, making part of this specification, in which—

Figure 1 is a top view; Fig. 2, a transverse section through A′ A′, and Figs. 3 and 4 parts of the machine to be hereinafter explained.

To enable others skilled in the arts to which my invention appertains to make and use the same I will proceed to describe the construction and operation thereof.

Similar letters of reference represent corresponding parts of the different figures of the drawings annexed.

Upon the drawing A represents the frame of the machine, which may be made of the form shown; or of such other form and proportion as will best fill the conditions of strength and convenience. Through the center of the frame the center pin F is introduced, and around this center pin and upon the frame a boss G is made, and upon this boss and over the center pin F the wheel D is laid a plan of which is shown at Fig. 3, and upon this wheel and over the pin F, a cap C is placed an inverted view of which is shown at Fig. 4. This cap C and wheel D are held upon the frame, and together by means of a small pin, passed through the center pin F, over a washer, in the manner shown, at F Fig. 1.

The hub of the wheel D is shown at E, and in it are cut angular cavities, to receive the inside ends of the bars B, and corresponding cavities are also cut in the under side of the cap C as shown at I, which lap over the ends of the bars B. Around the center pin F and over the hub of the wheel D there is a spider bracket placed as shown at *b*, to which the arms or bars B are fastened by means of the hooks *a* as shown. In the hub of the wheel D and between the arms thereof, scarf blocks *f* are introduced, which fit in the grooves *l l* of the Cap C, which secures the cap from turning and which makes it in effect a part of the hub of the wheel. The grooves *d d*, in the cap C are made to receive the arms of the bracket *b*. In the upper side of the cap C, and near the periphery, staples are driven, to which are fixed the chains *e* which lead from the said staples in the cap C to staples in the bars B, in the manner shown at Fig. 1, the object of these chains being to brace the bars so as to relieve the wheel D of the angular stress it would otherwise have to support, one of the objects of this invention being to concentrate the stress upon the center of the wheel, (that is to say the hub) and relieve the rim, and it will be seen that the whole construction tends to the accomplishment of that end. But the above is not the only object sought after, in this connection, as my design is to make a cheap, strong and convenient apparatus to apply horse power to and convey it to the desired object. It is proper to remark here that cogs are to be cut in the rim of the wheel D, to which a pinion rug be applied through which the power is to be conveyed to the machine it is proposed to propel.

What I claim as my invention and desire to secure by Letters Patent, is—

The combination of the loose cap C with the hub E of the wheel D, and the ends of the bars B, and also bracing the said bars from the said cap C by means of chains *e e e*, for the purpose of taking the stress off of the rim of the wheel D and concentrating it in the said cap. And also, the combination of the spider bracket *b* with the loose cap *c*, and the center pin and the center pin and the hub E, for the purpose of securing the ends of the bars B substantially as described.

W. P. PENN.

Witnesses:
H. C. BLACKWELL,
JOSEPH MEYER.